United States Patent
Eskesen et al.

[11] Patent Number: 5,897,658
[45] Date of Patent: Apr. 27, 1999

[54] METHOD AND APPARATUS FOR PROTECTING PORTIONS OF MEMORY BY PROVIDING ACCESS REQUESTS TO A COMMUNICATIONS AREA FOR PROCESSING BY A HIDDEN SERVER

[75] Inventors: Frank Norman Eskesen, Saugerties; Michel Henri Theodore Hack, Peekskill; Nagui Halim, Yorktown Heights; Richard Pervin King, Thornwood, all of N.Y.

[73] Assignee: International Business Machines Corporation, Armonk, N.Y.

[21] Appl. No.: 08/816,917

[22] Filed: Mar. 13, 1997

Related U.S. Application Data

[60] Provisional application No. 60/031,494, Nov. 26, 1996.
[51] Int. Cl.⁶ .................................................... G06F 12/14
[52] U.S. Cl. ............................ 711/152; 711/163; 711/147; 711/153
[58] Field of Search .................................... 711/152, 163, 711/147, 153

[56] References Cited

U.S. PATENT DOCUMENTS

| | | | |
|---|---|---|---|
| 4,564,903 | 1/1986 | Guyette et al. | 711/201 |
| 5,386,552 | 1/1995 | Garney | 395/182.08 |
| 5,423,044 | 6/1995 | Sutton et al. | 395/726 |
| 5,649,099 | 7/1997 | Theimer et al. | 395/187.01 |
| 5,673,394 | 9/1997 | Fenwick et al. | 395/682 |

OTHER PUBLICATIONS

M. Abbott et al., "Durable Memory RS/6000™ System Design", IEEE, pp. 414–423, Jun. 1994.
C. R. Attanasio et al., "Design and Implementation of a Recoverable Virtual Shared Disk", pp. 1–26, Nov. 22, 1994.

*Primary Examiner*—Tod R. Swann
*Assistant Examiner*—Felix B. Lee
*Attorney, Agent, or Firm*—Ratner & Prestia

[57] ABSTRACT

A memory in a computer system includes a visible portion and a hidden portion. The visible portion of the memory is addressable by a processor and the operating system operating within the computer system. Addressability by either the processor or the operating system is excluded to the hidden portion of the memory. The hidden portion of the memory is used for storing data transmitted by either the processor or the operating system. A communications area, located in the visible portion of memory receives requests for data access from either the processor or the operating system. A hidden server which addresses both the visible portion of memory and the hidden portion of memory receives requests for data access from the communications area and initiates data access from the hidden memory.

12 Claims, 6 Drawing Sheets

METHOD AND APPARATUS FOR PROTECTING PORTIONS OF MEMORY BY PROVIDING ACCESS REQUESTS TO A COMMUNICATIONS AREA FOR PROCESSING BY A HIDDEN SERVER

CROSS-REFERENCE TO RELATED APPLICATION

The present application claims priority to co-pending U.S. provisional application Ser. No. 60/031,494 filed Nov. 26, 1996.

FIELD OF THE INVENTION

The present invention relates to computer systems, in general, and more specifically to the protection of data stored in portions of memory located within computer systems. In particular, mechanisms are disclosed which transfer data between a computer system and a portion of memory to which the operating system does not have direct access rights.

BACKGROUND OF THE INVENTION

When a process is running on a computer system, the process uses designated portions of memory to store and retrieve data. Other processes may also have access to those designated portions of memory.

When a first process running on a computer system is stopped and later resumed, a second process running on the computer system while the first process was stopped may have access to the portion of memory previously used by the first process. If, while the first process is stopped, the second process overwrites data values which have been stored in the memory by the first process, then when the first process resumes, the data values which it had stored in memory before it had been stopped may no longer be available. This may create errors.

In addition, if several processes are running simultaneously in a computer system, one process may store data in a portion of memory being used by another process. Thus, prior to a process retrieving the data it had stored, that data may be corrupted.

It is also typical that a computer system may be subjected to a system restart. Such a computer system may have a software application running which provides data buffers whose contents are not erased as part of a system restart. This may be found, for example, in a software package known as Transaction Processing Facility (TPF) which is a product of IBM Corporation, Armonk, N.Y. In TPF, if there is a system restart, the contents of certain data buffers are not erased. After the restart is complete, when TPF continues running at the point it was at prior to the system restart, it is desirable that the contents of the non-erased data buffers remain the same. However, these data buffers are accessible to any application running on the system. These data buffers could therefore be corrupted by errors in either the operating system or the applications running on the operating system.

SUMMARY OF THE INVENTION

A memory in a computer system includes a visible portion and a hidden portion. The visible portion of the memory is addressable by a processor and the operating system operating within the computer system. Addressability by either the processor or the operating system is excluded to the hidden portion of the memory. The hidden portion of the memory is used for storing data transmitted by either the processor or the operating system. A communications area, located in the visible portion of memory receives requests for data access from either the processor or the operating system. A hidden server which addresses both the visible portion of memory and the hidden portion of memory receives requests for data access from the communications area and initiates data access from the hidden memory.

DETAILED DESCRIPTION OF THE INVENTION

Figure 1:
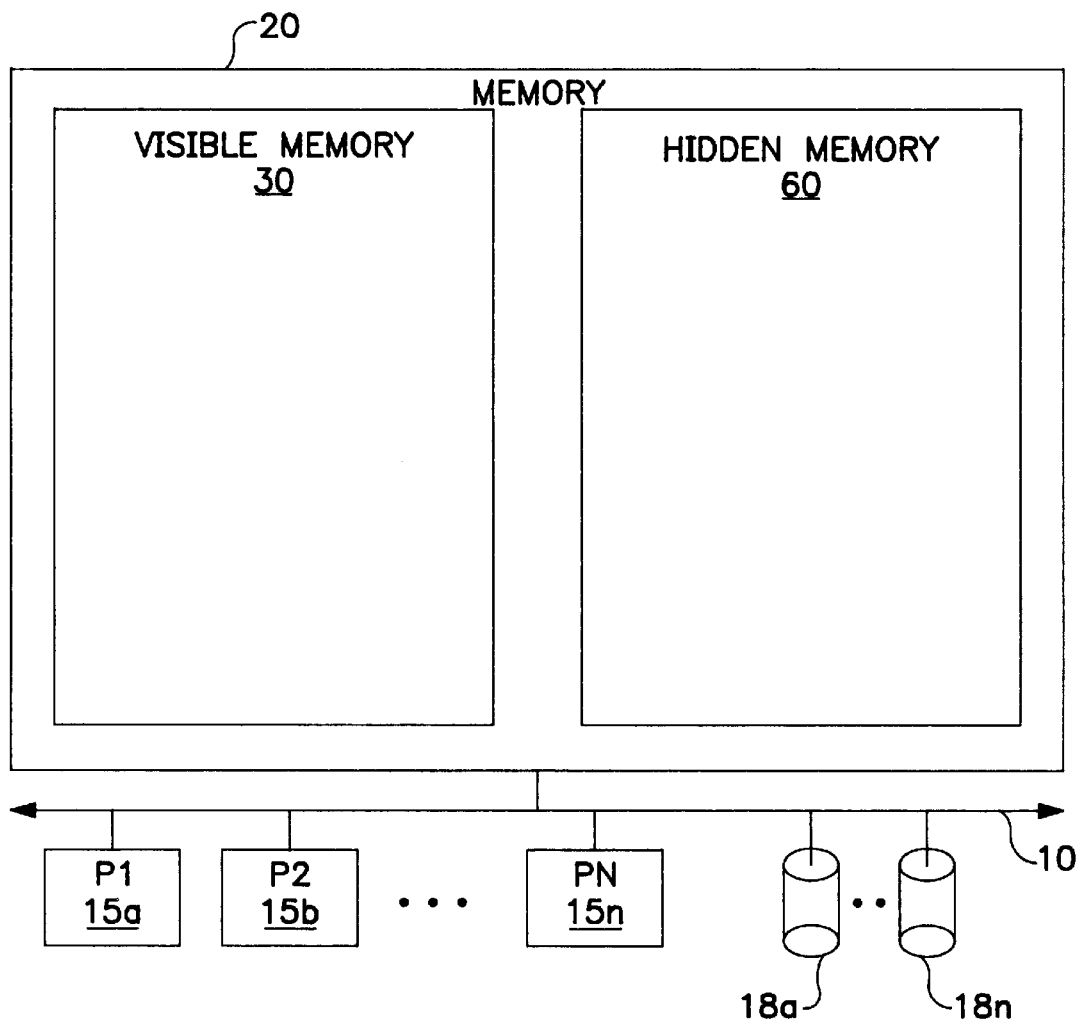
FIG. 1 is a block diagram which illustrates the configuration of memory and its relationship to a plurality of processors and a plurality of input/output (I/O) units in accordance with an exemplary embodiment of the present invention.

FIG. 1 illustrates a computer system in accordance with an exemplary embodiment of the present invention. As depicted, the computer system hardware includes one or more processors 15a–15n connected via some bus or other interconnection mechanism 10 to memory 20.

Any computer system may be used but, in accordance with an exemplary embodiment of the present invention, a Durable Memory RS/6000 (DM/6000) may be used, as described in "Durable Memory RS/6000 System Design," by Abbott, M., Har, D. Herger, L., Kauffman, M., Mak, K., Murdock, J., Schulz, C., Smith, T. B., Tremaine, B., Yeh, D., Wong, L., Digest of the 24th International Symposium on Fault Tolerant Computing, pp. 414–423, June 1994. This system provides hardware redundancy such that failure of any one hardware component or of electrical power supplies will not halt the computer.

A portion of memory 20 is visible memory 30. Programs running on each processor 15a–15n have access rights to visible memory 30.

Figure 2:
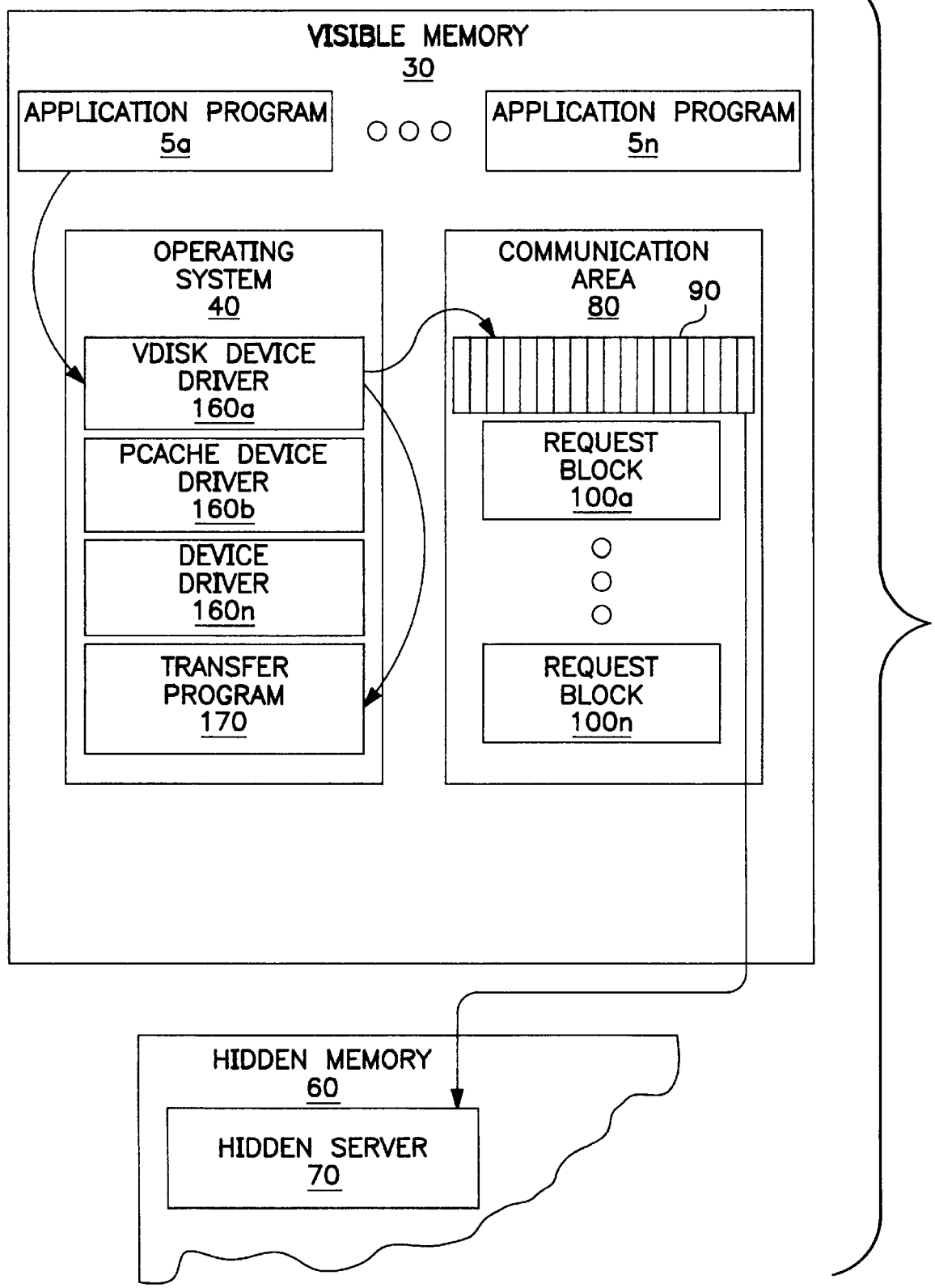
FIG. 2 is a block diagram which illustrates the configuration of the visible memory shown in FIG. 1 and the communication path between the visible memory and the hidden memory shown in FIG. 1.

As shown in FIG. 2, visible memory 30 includes a general-purpose operating system 40, such as AIX (manufactured by IBM Corporation, Armonk, N.Y.), as well as application programs 5a–5n. A further portion of memory 20 is hidden memory 60. There are several methods for preventing the operating system 40 and application programs 5a–5n from having access to this hidden memory. A preferred method takes advantage of the ability to instruct AIX that certain portions of memory 20 are defective. When AIX is booted, it expects to find an IPL control block which includes a description of the areas of memory which are defective. AIX will never access or in any way alter the contents of any memory identified as defective, and makes no note of such memory in its virtual address tables. As such, this memory is effectively hidden as soon as AIX turns on virtual address translation for whichever of the processors 15a–15n it is using. In this manner, memory 60 is never in danger of being modified even during the brief period of initialization during which it is accessible. Other operating systems enable available memory to be designated when booted. If booted with a designation of available memory smaller than total actual memory, the portions of memory outside of the available memory designated areas will be invisible to the operating system.

A hidden server 70 controls access to hidden memory 60. Hidden server 70 is a program loaded in hidden memory 60. Address translation in the hidden server 70 may be turned off. The hidden server 70 and both the operating system 40 and the application programs 5a–5n share use of a communication area 80 located in visible memory 30. This is the mechanism by which hidden server 70 and both operating system 40 and application programs 5a–5n communicate. By placing all communication mechanisms in visible memory 30, the possibility of damage to hidden memory by the operating system 40 and application programs 5a–5n is eliminated.

In the preferred embodiment, the communication area 80 includes queue 90 and request blocks 100a–100n. Queue 90 desirably occupies a single page of storage, and all of the pointers used to form the chain elements of the queue are desirably not addresses, but are, instead, offsets within that page. Thus, queue 90 can be manipulated by programs running under the operating system 40, which operates with virtual address translation turned on, and by the hidden server 70, which may operate with virtual address translation turned off. The entries in queue 90 have chain offsets to link the entries in the queue and the real addresses of request blocks 100a–100n. By using the real address for the head pointer of the queue, the hidden server 70 can make use of the head pointer without, for example, making use of AIX's mechanisms for virtual address translation.

Figure 3:
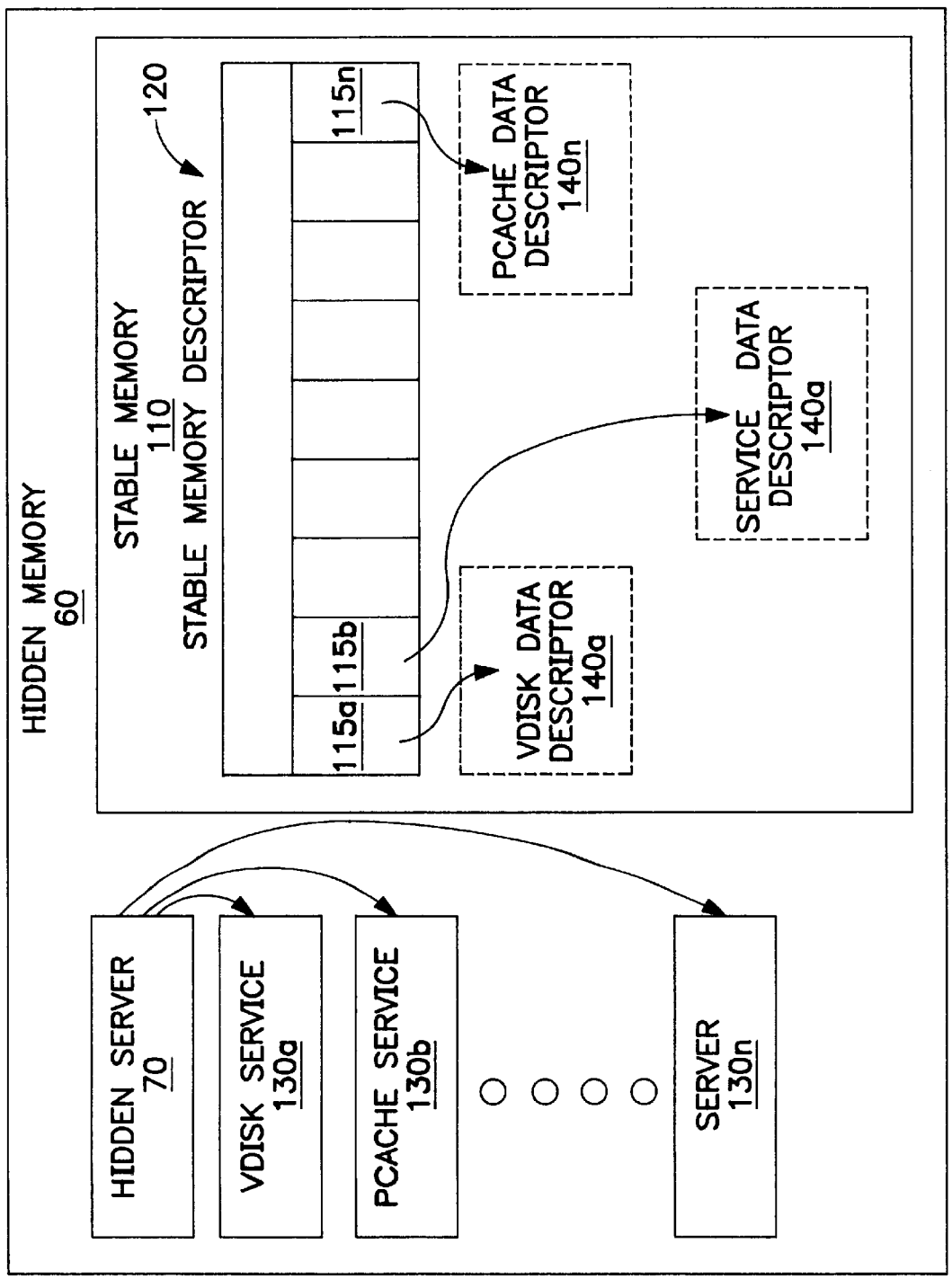
FIG. 3 is a block diagram which illustrates the internal configuration of the hidden memory shown in FIG. 1.

As shown in FIG. 3, one portion of hidden memory 60 is the stable memory 110. This contains a stable memory descriptor 120, which the hidden server 70 can locate by using a pre-a ranged address, and which the hidden server 70 uses to identify which portions of stable storage 110 are in use. A small portion of the stable memory 110 is used by the hidden server 70 for its own record keeping, but most of stable memory 110 is used by specialized services 130a–130n, which are programs accessible to the hidden server 70. For example, the preferred embodiment includes a VDISK service 130a and a PCACHE service 130b, as well as other services.

The VDISK service 130a processes commands to use space in stable memory 110 to store data as though it were on one or more disks. Each space in memory being used in this manner is referred to as a VDISK. The VDISK service 130a is desirably at least able to offer the ability to handle requests to allocate space in stable memory 110 to be used to store data, requests to copy data from visible memory 30 to stable memory 110, and requests to copy data from stable memory 110 to visible memory 30. The PCACHE service 130b caches data that is intended to be written to disk, but at a later time. The disk address of the data is stored by the PCACHE service 130b along with the data itself to allow for reconstruction of cache information after a failure of the operating system 40.

When the hidden server 70 is loaded and started, the stable memory descriptor 110 is tested for validity and, if it is not valid, initialized to indicate that none of stable storage is in use. Possible tests of validity are, for example, comparison of a checksum value against one computed afresh for the contents of the stable memory descriptor 110, totaling of memory usage counts to see that they match the total amount of stable storage 110, and comparison of characteristic key values placed in the stable storage descriptor 110 upon completion of the hidden server's 70 initialization of memory. This use of the preexisting stable memory descriptor 110 by a newly started version of the hidden server 70 makes possible the replacement of the code for the hidden server 70 without apparent loss of information. It is of course desirable that the new version of the hidden server 70 be capable of interpreting the old version's stable memory descriptor 110.

The hidden server 70 uses a portion of the stable memory descriptor 120 to record service data handles 115a–115n, each assigned to a different service 130a–130n. A service data handle points to a data descriptor. A data descriptor indicates portions of hidden memory 60 available for a respective service.

For example, the VDISK service 130a uses a VDISK data descriptor 140a. Whenever the hidden server 70 is started, the VDISK service 130a is started (as are all other services 130b–130n), and is given a copy of its service data handle 115a, which is either zero, or is a pointer to VDISK data descriptor 140a. The VDISK service 130a confirms that its service data handle 115a points to a VDISK data descriptor 140a and the validity of this descriptor 140a just as the hidden server 70 confirms the existence and validity of the stable memory descriptor 120. If the VDISK service 130a finds no valid VDISK data descriptor 140a, then it requests allocation of one by the hidden server 70 and initializes it to indicate that there are not yet any VDISKs in existence. The VDISK data descriptor 140a is used to record what portions of stable memory 110 are being used for storage of data on behalf of its users in the operating system 40 and applications 5a–5n.

This use of service data handles 115a–115n and data descriptors 140a–140n allow a service 130a–130n to be stopped and restarted without loss of information or apparent interruption of operation in much the same way as the hidden server 70 can be stopped, replaced, and restarted. As with the hidden server 70, it is desirable that the data descriptors 140a–140n as produced by the old versions of services 130a–130n be understood by the new version of the services 130a–130n.

In the preferred embodiment, requests to the hidden server 70 include the name of the services 130a–130n that is to process the request, so that the hidden server 70 can pass the request to that services 130a–130n. Additional request information which any service may need may be found in the request block 100a–100n. In the case of the VDISK service 130a, this includes a command code indicating whether to create a VDISK, space for operands like a VDISK identifier to indicate which VDISK to operate on, and space for any response information, like a return code that indicates the success or failure of the request and a completion bit to indicate when the VDISK service 130a is done processing the request.

In the preferred embodiment, the VDISK service 130a is used by a VDISK device driver 160a, which is installed into the operating system 40. The VDISK device driver 160a provides the same interface as any disk device driver installed on the operating system 40, using the VDISK service 130a instead of a real disk device for the storage and retrieval of data. This allows the rest of the operating system 40 and the application programs 5a–5n to use VDISKs just like any real disks. Because the hidden memory 60 is never corrupted by any failure of any program running in visible memory 30, because the stable memory 110 is preserved in the face of restarts of the hidden server 70 and its related services 130a–130n, and because of the fault tolerance and power protection features of the DM/6000 hardware, the data stored by the VDISK service 130a in the stable memory 110 can be regarded as being stored as safely as on real magnetic disks.

All addresses passed to the hidden server 70 are real addresses in visible memory 30, which the VDISK device driver 160a, running under AIX, determines using kernel services of AIX, and request blocks 100a–100n are desirably restricted to a single page of memory, to avoid problems with address translation.

When the hidden server 70 runs on a subset of the processors 15a–15n that is disjoint from that on which the operating system 40 is running, the processing of requests by the hidden server 70 is concurrent with processing of the operating system 40 and application programs 5a–5n. When the hidden server 70 and the operating system 40 and application programs 5a–5n share the same processors 15a–15n, then control is desirably transferred back and forth between the two using a transfer program 170 that records the state of the processors 15a–15n as currently set up for use by the operating system 40 and then changes the state of the processors 15a–15n so as to allow the hidden server 70 to function properly. The state to be recorded may include, among other things, the contents of registers and the settings of the virtual address translation unit.

In the preferred embodiment, the transfer program 170 is placed in the first 64KB of memory. AIX always sets its virtual storage tables such that this portion of memory has the same virtual addresses as its real addresses. Programs in this region of memory can therefore turn address translation on or off and still have instruction execution proceed to the next instruction in the same program.

Although other means of signaling between the VDISK device driver 160a running under the operating system 40 and the VDISK service 130a are possible, for example using interrupts, the preferred embodiment uses a completion flag in the response area of the request block 100a–100n. The VDISK device driver 160a synchronously loops between checking the completion flag and giving control to the hidden server 70, if this hidden server 70 is sharing the same processor as the operating system 40.

The entire flow path of a request for data in a VDISK from an application 5a–5n until the delivery of that data back to that same application is as follows. The request first goes to the operating system 40, which determines that the device is a VDISK device. The request is therefore passed to the VDISK device driver 160a, which determines which VDISK contains the data and builds, in a request block 100a–100n a request, indicating that this is a request for the VDISK service, which VDISK to get the data from, where in the VDISK to start reading, how much data to transfer, and where in the visible memory 30 to place the data to be read. Note that at this time the completion flag in the request block 100a–100n is set to indicate that the request is not complete. Next, the VDISK device driver 160a places a queue entry in the queue 90 that points to this request block 100a–100n and starts waiting for the completion flag to indicate that the request is complete. While waiting, the VDISK device driver 160a will, if the processor 15a–15n is being shared between the operating system 40 and the hidden server 70, call the transfer program 170 to give control of the processor 15a–15n to the hidden server 70. In any case, the hidden server 70 will, in its turn, dequeue this queue entry and determine, from the request block 100a–100n should be processed by the VDISK service 130a. Using its service data handle 115a, the VDISK service 130a will locate its VDISK data descriptor 140a and, thereby, the VDISK data, which it will then copy to the portion of visible memory mentioned in the request block 100a–100n, and then set the completion flag to indicate that the operation is complete. Control of the processor 15a–15n returns to the hidden server 70, which, if it is shared by the hidden server 70 and operating system 30, will in turn return control to the transfer program 170, and, hence, to the VDISK device driver 130a. In any case, the VDISK device driver 160a will eventually have control of the processor 15a–15n and observe that the completion flag is set, and return control to the operating system 30, which will return control to the application program 5a–5n that made the original request.

The PCACHE device driver 160b is very similar to the VDISK device driver 160a, in that, to the operating system 40 and the application programs 5a–5n, it has the appearance of being a real disk device, and also that it stores and retrieves data from stable memory using the hidden server 70 and the PCACHE service 130b. The difference is that the PCACHE device driver 160b is only using the PCACHE service 130b to maintain a cache of data recently read from or written to a real disk 18a–18n, which the PCACHE device driver 160b accesses using the device driver 160a–160n for that particular disk device 18a–18n. This is much that same as the way the VSD device driver operates as described in "Design and Implementation of a Recoverable Virtual Shared Disk", by C. R. Attanasio, M. Butrico, C. A. Polyzois, S. E. Smith, IBM T. J. Watson Research Center, RC-19843, Nov. 22, 1994.

In the case of a failure of the operating system 40, the contents of visible memory 30 are completely lost. When the operating system 40 is restarted, the PCACHE device driver 160b rebuilds its directory of cache location information by requesting of the PCACHE service 130b the list of home addresses of those blocks currently present in stable memory 110. The PCACHE device driver 160b can then rebuild whatever internal data structure it uses to monitor the state of the cache, for example a hash table, so that during normal operation no use need be made of the directory information stored by the PCACHE service 130b.

Figure 4:
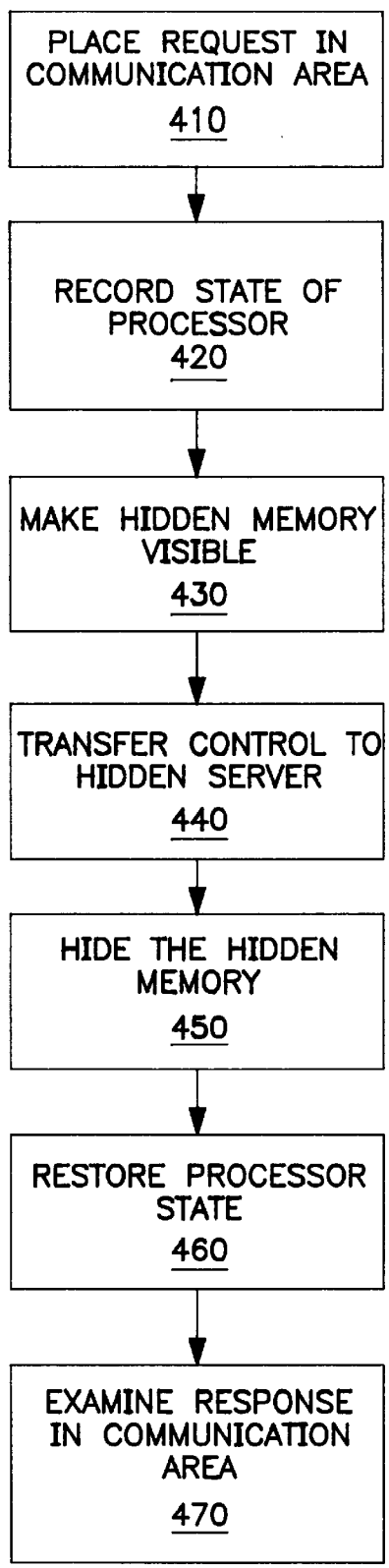
FIG. 4 is a flow chart diagram which illustrates certain processing steps for the operating system to relinquish control of a processor to the hidden server in accordance with an exemplary embodiment of the present invention.

FIG. 4 is a logic flow chart diagram of the steps taken by the operating system 40, or, more specifically, a device driver 160a–160n installed in the operating system, and the transfer program 170 to perform this transfer of control. First, any request intended to be processed by the hidden server 70 and a specialized service 130a–130n is placed in the communication area 80 in some request block 110a–110n (step 410). Then, the state of which processor 15a–15n is executing these steps is recorded somewhere in visible memory 30 (step 420). To make hidden memory 60 visible to this processor (step 430), in the preferred embodiment, virtual address translation of the processor is turned off although other means may well be possible. Now that hidden memory 60 is accessible by this processor, it can start executing instructions contained in the program of the hidden server 70 (step 440). Whenever the hidden server 70 is ready to relinquish control of the processor, execution resumes in the transfer program 170 at the next step of this program, which proceeds to hide the hidden memory 60 (step 450). This is accomplished in the preferred embodiment by turning virtual address translation back on. The rest of the state of the processor can then be restored (step 460), and control returned to the device driver 160a–160n that initiated the transfer. Response data placed in the communication area 80, or where it may have been placed in visible memory 30, can then be examined (step 470).

Figure 5:
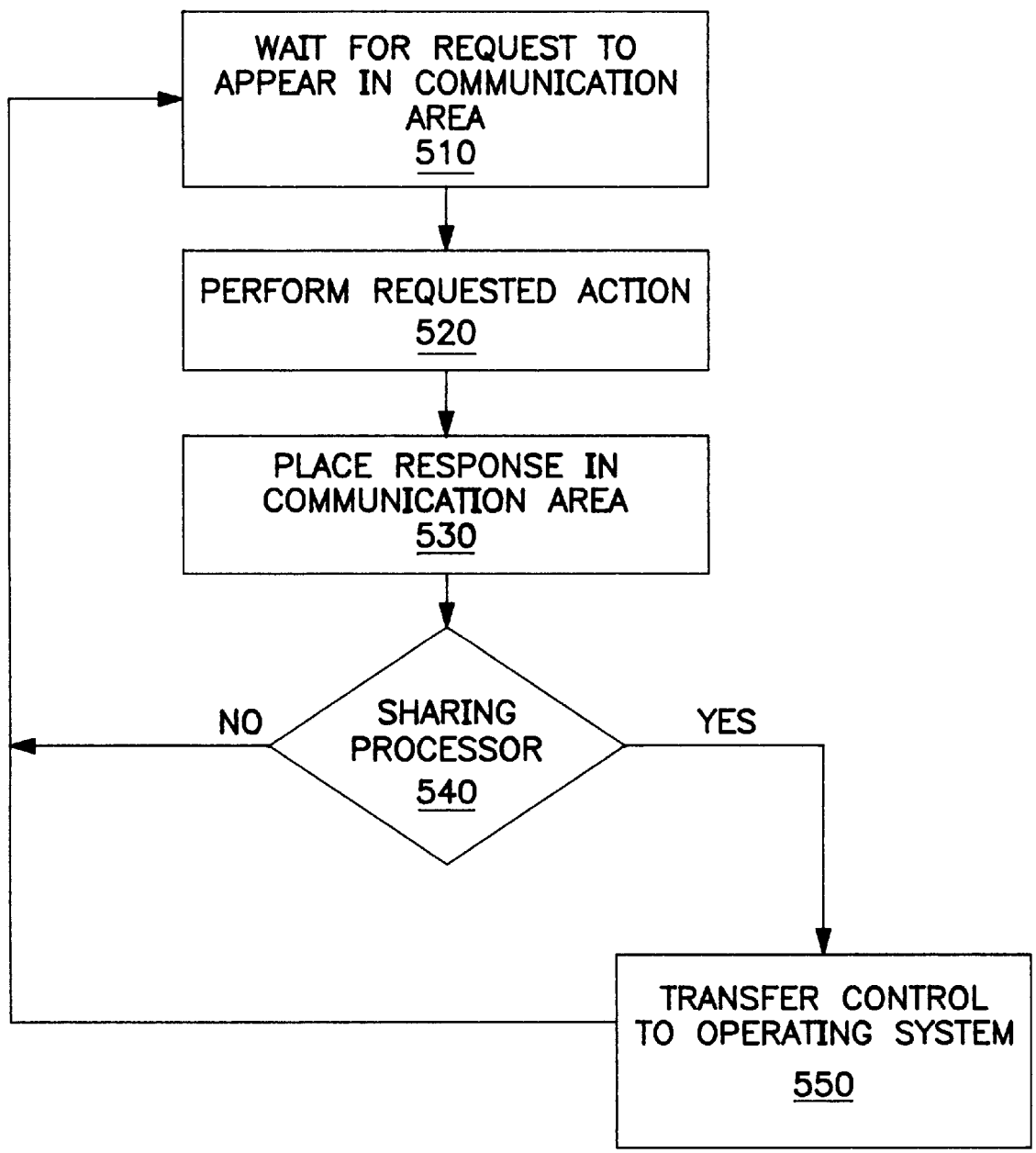
FIG. 5 is a flow chart diagram which illustrates the steps performed by the hidden server of FIG. 3 in accordance with an exemplary embodiment of the present invention.

FIG. 5 is a logic flow chart of the steps performed by the hidden server 70 in order to process a request. The first step 510 is to wait for a request to appear in the communication area 80. When that occurs, some processing, as appropriate to the nature of the request that was made, is performed at step 520. The request data will, for instance, indicate some particular service to give the request to and the command to be performed by that service. The result of this is that response information is placed in the communication area 80 or in any location in visible memory 30 (step 530). For example, the contents of the original request can identify a location in visible memory 30 but outside of the communication area where the response information for a particular request should be placed. Then, at step 540, a test is made as to whether the processor now running the hidden server 70 program is also used to run the operating system 40. This can be done by any number of means, such as by examination of configuration information residing in the communication area. If the processor is shared, then the hidden server would, at this point 340, transfer control back to the operating system 40 (step 550).

Figure 6:
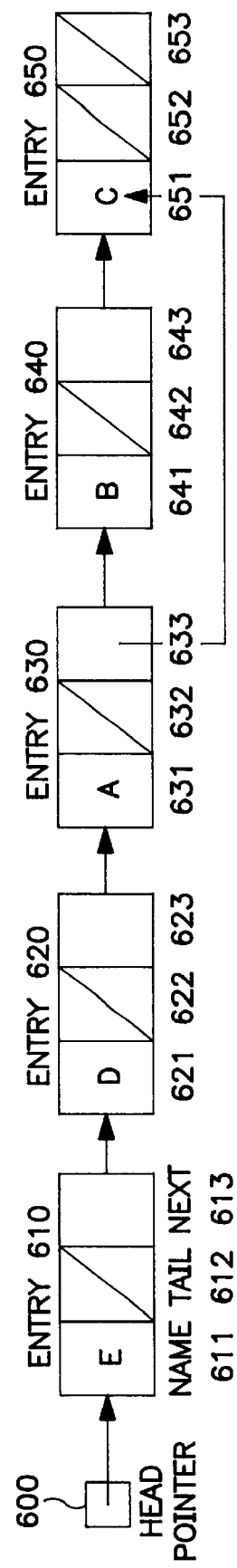
FIG. 6 is a block diagram which illustrates the configuration of the queue used to pass requests to the hidden server in accordance with an exemplary embodiment of the present invention.

FIG. 6 is an example of how the queue 90 in the communication area 80 might look after a series of requests had been placed in it. The A entry is the oldest, while the E entry 610 is the entry most recently added to the queue 90. To avoid interference between the enqueueing and dequeueing of entries, a form of synchronization is required. While, for example, a TEST and SET (IBM 370) instruction sequence may be used to ensure synchronization, in the preferred embodiment, the load-and-reserve and store-conditionally instructions of the PowerPC architecture are used. As is known in the art, the load-and-reserve instruction creates a reservation on a memory location for use by the store conditionally instruction. The store conditionally instruction first determines whether there is a reservation on the memory location to which storing is being attempted. If a reservation exists, the storage occurs and the reservation is cleared. If no reservation exists, the instruction completes without altering memory.

To enqueue a queue entry, a load-and-reserve is performed on the word in the queue header that contains the offset of the first entry in the queue. The new entry's "next" offset is then set to that value. Finally, the offset of the new entry is stored in the queue header, on the condition that one's reservation on that word is still present. If it is not present, then the enqueuing procedure is repeated.

For example, the E entry 610 was added by loading, with a reservation, the head pointer 600, which before the addition of the E entry 610 had pointed to the D entry 620. This pointer is placed in the next field 613 of the E entry 610. Finally, the address of the E entry 610 is stored conditionally in the head pointer 600. If the store succeeds, the enqueue is done. Otherwise, the process is repeated.

This, of course, gives a queue organized in LIFO fashion. Giving the queue a FIFO flavor is done in the dequeueing process. To dequeue an entry, loading-and-reserving of the head offset is performed in the queue header. Then, the whole queue is removed from the queue header by storing, conditionally, a zero in place of that value. With the entire queue in hand, the server is free to take the oldest request off of the queue. If the queue is otherwise empty, dequeuing is done. Otherwise, what remains is returned to the queue header.

When returning what remains to the queue header, if other entries have been put on the queue in the meantime, entries are desirably merged with the set of entries removed by the dequeuing process. To accomplish the merge, the head offset (the word in the queue header which points to the first entry in the queue) is subject to a load-and-reserve. If the head offset contains a zero, there are no new entries. Thus, the offset of the entry which is now at the head of those entries being returned to the queue is stored conditionally. Otherwise, a zero is stored conditionally and the value loaded is used as the start of a new queue to be merged with the old one. The process is then repeated. Either way, if there is a failure to store, the entire process is repeated.

TO dequeue an entry 610–650, the oldest entry is desired. In this example, that is the A entry 630. To do this, the entire chain is removed by repeatedly loading, with a reservation, the head pointer 600 and storing, conditionally, a zero in its place. This is done, repeatedly, until the store succeeds. The queue is then traversed until an entry is reached whose tail pointer is non-zero. In this example that would be the tail pointer 632 of the A entry 630. The entries before the A entry 630 are in last-in-first-out order, as determined by the enqueue algorithm. The entries after the A entry 630 are in first-in-first-out order, which the hidden server 70 would preserve by rearranging the entries into the order B-C-D-E (the A entry 630 not being there because that is the one being removed from the queue 90). The B entry 640 would have its tail pointer 642 set to point to the E entry 610. This indicates two things: that the B entry 640 is the first of the first-in first-out entries, and that new entries found in last-in-first-out order should be placed after the entry that the tail pointer 642 points to. This saves running sequentially down the entire queue 90 every time the queue 90 needs to be rearranged.

Returning the remaining entries to the queue 90 is much like enqueueing an entry. The difference is seen when some other entries have been placed on the queue 90 while the hidden server 70 was manipulating the entries as part of the dequeueing process. In that case, the value loaded from the head pointer 600 is non-zero and points to the newly enqueued entries. The correct response is for the hidden server 70 to remove those entries, as in normal dequeueing and combine them with those entries it had previously removed to form a single list and to go back to repeat the process of putting this list back on the queue 90.

An optimization is performed to avoid running to the end of the LIFO chain every time the oldest entry on the chain is wanted. This involves reordering the entries before returning the list to the queue. The reordered entries, now in FIFO order, all contain the offset of the tail of the list. This allows the entries in FIFO order to be distinguished from entries in LIFO order, which have a zero instead of a tail offset, and it allows the tail to be located quickly for insertions at the end. While new entries are being enqueued, there will be some LIFO entries followed by some FIFO entries, but that can be corrected by the hidden server the next time the hidden server dequeues.

While we have described the preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed:

1. A computer system, including a memory, at least one processor and an operating system, comprising:
   a visible portion of said memory which is addressable by said at least one processor and said operating system;
   a hidden portion of said memory a) to which addressability by said at least one processor and said operating system is excluded and b) which is used for storing data transmitted by at least one of said at least one processor and said operating system;
   a communication area, located in said visible portion of said memory, for receiving requests for data access from at least one of a) said at least one processor and b) said operating system; and
   a hidden server which a) addresses both said visible portion of said memory and said hidden portion of said memory, b) receives said requests for data access from said communication area, and c) initiates said data access from said hidden memory.

2. A computer system according to claim 1, wherein said hidden server is executed by a first processor of said at least one processor and said operating system is executed by a second processor of said at least one processor.

3. A computer system as recited in claim 1, wherein said processor is in one of a first state where hidden memory is not visible to said processor and a second state where hidden memory is visible to said processor, said apparatus further comprising:
   means for altering said processor between said first state and said second state;
   means for initiating a desired operation by said hidden server while said hidden server is in said second state.

4. A computer system as recited in claim 1, wherein said hidden server is reloadable and restartable, and wherein said visible portion of said memory is identical both immediately prior to and immediately after restarting of said hidden server.

5. A computer system as recited in claim 1, further comprising RAM disk service means for storing data in said hidden portion of said memory and for surviving failures and restarts of the operating system and reloads and restarts of the hidden server.

6. A computer system as recited in claim 1, further comprising disk cache service means for storing data in said hidden portion of said memory and for surviving failures and restarts of said operating system and reloads and restarts of the hidden server.

7. A method of protecting data stored in a memory located within a computer system, wherein said computer system includes at least one processor and an operating system, said method comprising the steps of:
   allocating a visible portion of said memory which is addressable by said at least one processor and said operating system;
   allocating a hidden portion of said memory a) to which addressability by said at least one processor and said operating system is excluded and b) which is used for storing data transmitted by said at least one processor and said operating system;
   receiving in a communications area located in said visible memory requests from at least one of a) said at least one processor and b) said operating system; and
   receiving each of said requests by a hidden server which addresses both said visible portion of said memory and said hidden portion of said memory; and
   initiating each of said requests from said hidden memory.

8. A method of protecting data stored in a memory according to claim 7 further comprising the steps of:
   altering said processor from a first state where said hidden portion of said memory is not visible to said processor to a second state where said hidden portion of said memory is visible to said processor;
   transferring control of said processor to said hidden server;
   receiving by said hidden server a request to perform a desired operation;
   initiating said desired operation by said hidden server;
   terminating control of said processor by said hidden server; and,
   altering said processor from said second state to said first state.

9. A method of protecting data stored in a memory according to claim 8, further comprising the steps of:
   reloading said hidden server;
   restarting said hidden server; and
   maintaining said visible portion of said memory identical both immediately prior to and immediately after restarting of said hidden server.

10. A method of protecting data stored in a memory according to claim 7, further including the step of providing a RAM disk service which stores data in said hidden portion of said memory and which survives failures and restarts of the operating system and reloads and restarts of the hidden server.

11. A method of protecting data stored in a memory according to claim 7, further including the step of providing a disk cache service which stores data in said hidden portion of said memory and which survives failures and restarts of the operating system and reloads and restarts of the hidden server.

12. A method of protecting data stored in a memory according to claim 7, wherein said hidden server is executed by a first processor of said at least one processor and said operating system is executed by a second processor of said at least one processor.

* * * * *